United States Patent
Li

(10) Patent No.: US 10,204,599 B2
(45) Date of Patent: Feb. 12, 2019

(54) METHOD OF VISION CORRECTION IN A VIRTUAL REALITY ENVIRONMENT

(71) Applicant: Beijing Pico Technology Co., Ltd., Beijing (CN)

(72) Inventor: Wei Li, Beijing (CN)

(73) Assignee: BEIJING PICO TECHNOLOGY CO., LTD., Beijing (CN)

(*) Notice: Subject to any disclaimer, the term of this patent is extended or adjusted under 35 U.S.C. 154(b) by 119 days.

(21) Appl. No.: 15/364,629

(22) Filed: Nov. 30, 2016

(65) Prior Publication Data

US 2017/0345400 A1    Nov. 30, 2017

(30) Foreign Application Priority Data

May 27, 2016    (CN) .......................... 2016 1 0365809

(51) Int. Cl.
*G09G 5/38* (2006.01)
*G06F 3/01* (2006.01)
(Continued)

(52) U.S. Cl.
CPC .............. *G09G 5/38* (2013.01); *G06F 3/012* (2013.01); *G06F 3/013* (2013.01); *G06F 3/017* (2013.01);
(Continued)

(58) Field of Classification Search
CPC ............ G09G 5/38; G09G 2320/0606; G09G 2320/068; G09G 2354/00; G06F 3/04886;
(Continued)

(56) References Cited

U.S. PATENT DOCUMENTS

| 8,615,374 B1* | 12/2013 | Discenzo | G06F 15/00 |
| | | | 219/497 |
| 2012/0086637 A1* | 4/2012 | Ye | G06F 3/016 |
| | | | 345/158 |

(Continued)

FOREIGN PATENT DOCUMENTS

| CN | 102789313 A | 11/2012 |
| CN | 103439794 A | 12/2013 |

(Continued)

OTHER PUBLICATIONS

Chinese Office Action dated Jun. 5, 2018 issued in Chinese Patent Application No. 201610365809.3.

*Primary Examiner* — Vinh T Lam
(74) *Attorney, Agent, or Firm* — Arent Fox LLP

(57) ABSTRACT

A method of vision correction in a virtual reality environment, comprising: judging if a user is for the first time entering the virtual reality environment, if yes, providing the user with an initial visual position; monitoring in real time action of the user, and judging if the user is in a stable state in the virtual reality environment; if the user is in a stable state, adjusting the visual position of the user according to change of sight lines of the user; and if the user is in an unstable state, renewedly providing the user with an initial visual position; and monitoring in real time change of a scene in the virtual reality environment, and if the scene is taking discontinuous switching, renewedly providing the user with an initial visual position according to a new scene. The present disclosure performs automatic vision correction according to the usage scenes and the cognition custom of the user, which reduces user operation and improves the user experience.

11 Claims, 1 Drawing Sheet

(51) Int. Cl.
*G06F 3/0338* (2013.01)
*G06F 3/0488* (2013.01)
*G06F 3/16* (2006.01)

(52) U.S. Cl.
CPC ........ *G06F 3/0338* (2013.01); *G06F 3/04886* (2013.01); *G06F 3/167* (2013.01); *G09G 2320/0606* (2013.01); *G09G 2320/068* (2013.01); *G09G 2354/00* (2013.01)

(58) Field of Classification Search
CPC .......... G06F 3/013; G06F 3/017; G06F 3/167; G06F 3/012; G06F 3/0338
See application file for complete search history.

(56) References Cited

U.S. PATENT DOCUMENTS

| | | | |
|---|---|---|---|
| 2015/0015485 A1 | 1/2015 | Zavesky | |
| 2017/0038831 A1* | 2/2017 | Vidal | G06F 3/011 |
| 2017/0344107 A1* | 11/2017 | Aghara | G02B 27/0172 |
| 2018/0081448 A1* | 3/2018 | Woo | G06Q 50/10 |

FOREIGN PATENT DOCUMENTS

| | | |
|---|---|---|
| CN | 103593044 A | 2/2014 |
| CN | 105148514 A | 12/2015 |
| CN | 105573485 A | 5/2016 |

\* cited by examiner

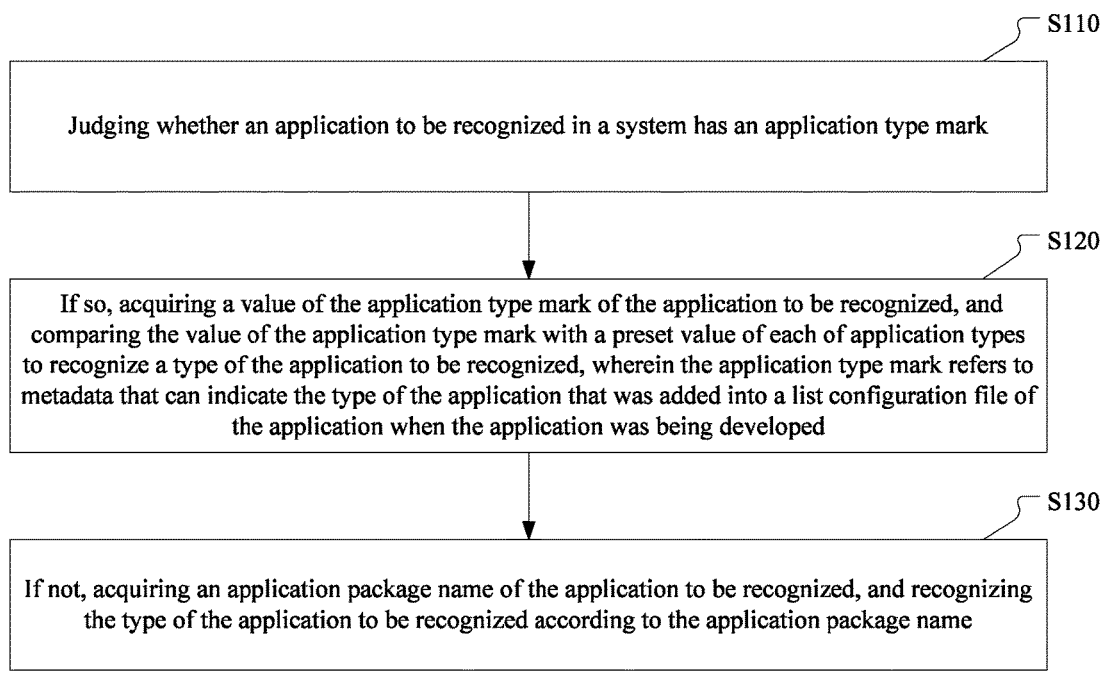

METHOD OF VISION CORRECTION IN A VIRTUAL REALITY ENVIRONMENT

CROSS-REFERENCE TO RELATED APPLICATION

This application claims the benefit and priority of Chinese Patent Application No. 201610365809.3 filed May 27, 2016. The entire disclosure of the above application is incorporated herein by reference.

TECHNICAL FIELD

The present disclosure relates to the technical field of virtual reality, and particularly to a method of vision correction in a virtual reality environment.

BACKGROUND

The virtual reality technology is gradually becoming mature. People can simulate a realty environment in a virtual environment, and the technology is extensively applied in fields such as games, movies and socialization. Due to the objective existence of realty environment, the user cannot always stay in a virtual environment and take experience for a long time; in fact, frequent switching between the realty environment and the virtual environment is inevitable. The most immediate and sensitive problem that is met in the process of the switching is the correction of visual sense. Currently, no method of automatic vision correction is available, and when a problem of visual position arises which affects the normal experiencing of the virtual environment, generally the user can only restart up the virtual reality device or reset the visual position by tedious menu operations, which affects the user experience.

SUMMARY OF THE DISCLOSURE

In order to realize vision correction according to the usage scenes and the cognition custom, and reduce operations during the process when the user is experiencing the virtual reality environment, to improve the user experience, the present disclosure provides a method of vision correction in a virtual reality environment, comprising:

judging if a user is for the first time entering the virtual reality environment, and when the user is for the first time entering the virtual reality environment, providing the user with an initial visual position;

monitoring in real time action of the user, and judging if the user is in a stable state in the virtual reality environment; when the user is in a stable state, adjusting the visual position of the user according to change of sight lines of the user; and when the user is in an unstable state, renewedly providing the user with an initial visual position; and monitoring in real time change of a scene in the virtual reality environment, and when the scene of the virtual reality environment is taking discontinuous switching, renewedly providing the user with an initial visual position according to a new scene.

Optionally, the judging if a user is for the first time entering the virtual reality environment specifically comprises:

providing a distance/light sensor on a virtual reality head-mounted device or utilizing a distance/light sensor already provided on a virtual reality head-mounted device, to monitor in real time a distance between the virtual reality head-mounted device and the head of the user; and when the distance/light sensor monitors that at a certain time moment the distance between the virtual reality head-mounted device and the head of the user becomes less than a preset distance from greater than the preset distance, determining that the user is for the first time entering the virtual reality environment at the time moment.

Optionally, the judging if a user is for the first time entering the virtual reality environment specifically comprises:

when a certain virtual reality application starts up, determining that the user is for the first time entering the virtual reality environment at the time moment when the virtual reality application starts up.

Optionally, the monitoring in real time the action of the user, and judging if the user is in a stable state in the virtual reality environment specifically comprises:

providing a geomagnetic sensor, a gyroscope and an accelerometer on a virtual reality head-mounted device or utilizing a geomagnetic sensor, a gyroscope and an accelerometer already provided on a virtual reality head-mounted device, to monitor in real time the action of the head of the user, and if the amplitude or the speed of the action exceeds a preset threshold, determining that the user is in an unstable state, or else determining that the user is in a stable state.

Optionally, the method further comprises: providing the user with an interface for manually performing vision correction, to enable the user to adjust the visual position by the interface according to his own needs.

Optionally, the providing the user with an interface for manually performing vision correction specifically comprises:

connecting a joystick to a virtual reality head-mounted device, and setting a correspondence relation between instructions of the vision correction and keys of the joystick; and when a certain key of the joystick is pressed down, sending a corresponding vision correction instruction to the virtual reality head-mounted device, to correspondingly adjust the current visual position of the user or renewedly provide the user with an initial visual position.

Optionally, the providing the user with an interface for manually performing vision correction specifically comprises:

defining a unique hand gesture corresponding to each of the instructions of the vision correction;

providing a hand gesture recognition module on a virtual reality head-mounted device or utilizing a hand gesture recognition module already provided on a virtual reality head-mounted device, to monitor hand action of the user; and when it is monitored that the user makes a certain predefined hand gesture, sending a corresponding vision correction instruction to the virtual reality head-mounted device, to correspondingly adjust the current visual position of the user or renewedly provide the user with an initial visual position.

Optionally, the providing the user with an interface for manually performing vision correction specifically comprises:

defining a unique voice instruction corresponding to each of the instructions of the vision correction;

providing a voice recognition module on a virtual reality head-mounted device or utilizing a voice recognition module already provided on a virtual reality head-mounted device, to monitor voice of the user; and when it is monitored that the user makes a certain predefined voice instruction, sending a corresponding vision correction instruction to the virtual reality head-mounted device, to correspondingly adjust the current visual position of the user or renewedly provide the user with an initial visual position.

Optionally, the providing the user with an interface for manually performing vision correction specifically comprises:

defining a unique eye action corresponding to each of the instructions of the vision correction;

providing an eye tracking module on a virtual reality head-mounted device or utilizing an eye tracking module already provided on a virtual reality head-mounted device, to monitor eye action of the user; and when it is monitored that the user makes a predefined eye action, sending a corresponding vision correction instruction to the virtual reality head-mounted device, to correspondingly adjust the current visual position of the user or renewedly provide the user with an initial visual position.

Optionally, the providing the user with an interface for manually performing vision correction specifically comprises:

displaying in the virtual reality environment a correction button corresponding to each of the instructions of the vision correction; and when a certain correction button is pressed down by the user, sending a corresponding vision correction instruction to the virtual reality head-mounted device, to correspondingly adjust the current visual position of the user or renewedly provide the user with an initial visual position.

The advantageous effects of the embodiments of the present disclosure are as follows: the present disclosure, by monitoring the state of the user using the virtual reality device and the change of the virtual reality scene, if the user is for the first time, or for the first time at a time moment, entering the virtual reality environment, if the user is in an unstable state in the virtual reality environment and if the scene of the virtual reality environment is taking discontinuous switching, provides the user with an initial visual position, realizes automatic vision correction according to the usage scenes and the cognition custom of the user, and enables the user to start from a proper visual position to experience the virtual reality environment, which reduces user operation and provides better user experience. In preferred embodiments, on the basis of the automatic vision correction according to the usage scenes and the cognition custom, the present disclosure provides an interface for manually performing vision correction, and provides various modes for manual correction, namely joystick keys, virtual push buttons, finger recognition, voice recognition and eye tracking. The user can, according to his own practical demands, adjust the visual position to an appropriate position by one or more of the above modes, to thereby satisfy the diverse demands of the user.

BRIEF DESCRIPTION OF DRAWINGS

FIG. 1 is the flow chart of a method of vision correction in a virtual reality environment provided by an embodiment of the present disclosure.

DETAILED DESCRIPTION

The design idea of the present disclosure is as follows: the present disclosure analyses the usage scenes and the cognition custom of the user, and when the user is for the first time, or for the first time at a time moment, entering the virtual reality environment, when the user is in an unstable state in the virtual reality environment or when the scene of the virtual reality environment is taking discontinuous switching, provides the user with an initial visual position, and enables the user to start from a proper visual position to experience the virtual reality environment, which reduces user operation. Furthermore, on the basis of the automatic vision correction, the user is provided with an interface for manually performing vision correction, thereby satisfying diverse demands of the user.

The embodiments of the present disclosure will be described below in further detail in conjunction with the FIGURES to make the objectives, technical solutions and advantages of the present disclosure clearer.

FIG. 1 is the flow chart of a method of vision correction in a virtual reality environment provided by an embodiment of the present disclosure. As shown in FIG. 1, the method of vision correction in a virtual reality environment provided by the embodiment of the present disclosure comprises:

Step S110: judging if a user is for the first time entering the virtual reality environment, and when the user is for the first time entering the virtual reality environment, providing the user with an initial visual position.

In a virtual reality environment, the user can see continually varying visions along with the turning of the head and the eyes, like in a realty environment. Therefore, when the user just starts to experience a virtual reality environment, it is needed to provide the user with an initial visual position, which position is taken as the point of origin, according to the states of the motion of the head of the user when wearing a virtual reality head-mounted device, compute in real time the direction of sight lines of the user, and display a corresponding image to the user.

As for how to judge if the user is for the first time, or for the first time at a time moment, entering the virtual reality environment, the embodiments of the present disclosure provide the following two methods:

In a preferred embodiment of the present disclosure, it is by providing a distance/light sensor on the virtual reality head-mounted device or utilizing a distance/light sensor already provided on the virtual reality head-mounted device to monitor in real time the distance between the virtual reality head-mounted device and the head of the user. The distance between the virtual reality head-mounted device and the head of the user when the user is normally wearing the virtual reality head-mounted device may be set as a preset distance. When the distance/light sensor monitors that at a time moment the distance between the virtual reality head-mounted device and the head of the user becomes less than the preset distance from greater than the preset distance, it means that the user has correctly worn the virtual reality head-mounted device, which originally was not correctly worn, and the experiencing of the virtual reality environment can be started, so it can be determined that the user is for the first time entering the virtual reality environment at the time moment, and the user is provided with an initial visual position.

The usage customs of different users may be different. For example, some users used to firstly turn on the power supply of the virtual reality device, and then wear the virtual reality head-mounted device, instead of firstly wearing correctly the virtual reality head-mounted device. If the time moment when the device is supplied power to start up is taken as the time when the user is for the first time entering the virtual reality environment, because during the process when the user is wearing the virtual reality head-mounted device he inevitably moves the device, when the user has worn correctly the head-mounted device, it is highly possible that the initial visual position that was provided to the user has been turned to other positions. Therefore, the present embodiment takes the time moment when the user has worn correctly the virtual reality head-mounted device as the time when the user is for the first time entering the virtual reality environment, which can be suitable for different usage customs.

In another preferred embodiment of the present disclosure, when the user operates the virtual reality device to start up a certain virtual reality application, for example start up a virtual reality movie or game, it can be assumed that the user has got ready and determines to start the experiencing of the virtual reality environment, so it can be determined that the user is for the first time entering the virtual reality environment at the time moment when the virtual reality application starts up. When using the virtual reality device the user may need to switch between different virtual reality applications; for example, after watching a virtual reality movie, the user wants to play a virtual reality game. Although the user has been all the while wearing the virtual reality head-mounted device and experiencing the virtual reality environment, when he switches to another virtual reality application, it is equivalent to that the user enters a new virtual reality environment, and at that time the user needs another initial visual position in the new environment. Therefore, it can be assumed that the user is for the first time entering the virtual reality environment at the time moment when the virtual reality application starts up.

Step S120: monitoring in real time action of the user, and judging if the user is in a stable state in the virtual reality environment; when the user is in a stable state, adjusting the visual position of the user according to change of sight lines of the user; and when the user is in an unstable state, renewedly providing the user with an initial visual position.

In a preferred embodiment, it is by providing a geomagnetic sensor, a gyroscope and an accelerometer on the virtual reality head-mounted device or utilizing a geomagnetic sensor, a gyroscope and an accelerometer already provided on the virtual reality head-mounted device, to monitor in real time the action of the head of the user, and if the amplitude or the speed of the action exceeds a preset threshold, determining that the user is in an unstable state, or else determining that the user is in a stable state. The stable state and the unstable state should be specially distinguished according to the situations of the virtual reality scenes experienced by the user. For example, when the user is normally using a certain virtual reality application, the motion of the head of the user should be a slow movement within a small range and the visual position of the user, just like in a realty environment, slowly and continuously changes along with the motion of the head, which state may be regarded as the stable state. If the user suddenly moves by a large amplitude or moves quickly, it can be assumed that the user is not normally experiencing the virtual reality application now and it is highly possible that the user is handing matters of the realty environment, which state is taken as the unstable state. A threshold of the stable state may be set, and when it is detected that the movement exceeds the threshold, above or below the threshold, it is determined that the user is in the unstable state, and the user is renewedly provided with an initial visual position, so that when the user returns to the stable state he can normally experience the virtual reality application.

Step S130: monitoring in real time the change of a scene in the virtual reality environment, and when the scene of the virtual reality environment is taking discontinuous switching, renewedly providing the user with an initial visual position according to a new scene. Even when the user has not switched between different virtual reality applications and has been all the while using the same virtual reality application, it is possible that a leaped switching of virtual scenes happens, which causes the user to enter a new virtual reality environment. For example, when the user is playing a virtual reality game and the game scene switches from indoor to a square, it is equivalent to that the user enters a new virtual reality environment, and it is needed to renewedly provide the user with an initial visual position.

Preferably, the method of vision correction in a virtual reality environment provided by the present disclosure further comprises: providing the user with an interface for manually performing vision correction, to enable the user to adjust the visual position by the interface according to his own needs.

Step S110 to Step S130, according to the usage scene and the operation custom of the user, automatically provide the user with an initial visual position, which facilities the user to start from the initial position as the origin to experience the virtual reality environment. However, the initial visual position that is automatically provided to the user may not be enough to satisfy the needs of all users, and it is possible that some users are not satisfied with the initial visual position. Therefore, in preferred embodiments, the user is provided with an interface for manually performing vision correction, to enable the user to adjust the visual position by the interface according to his own needs, thereby satisfying diverse demands of users.

There are many modes for manually performing vision correction. For example, in a preferred embodiment of the present disclosure, a joystick is connected to the virtual reality head-mounted device, and a correspondence relation between instructions of the vision correction and keys of the joystick is set. When the user presses down a certain key of the joystick, the joystick sends a corresponding vision correction instruction to the virtual reality head-mounted device, and the virtual reality head-mounted device, according to the received instruction, adjusts the current visual position of the user or renewedly provides the user with an initial visual position.

In another preferred embodiment of the present disclosure, a unique hand gesture is defined corresponding to each of the instructions of the vision correction, and a hand gesture recognition module is provided on the virtual reality head-mounted device or a hand gesture recognition module already provided on a virtual reality head-mounted device is utilized, to monitor hand action of the user. When it is monitored that the user makes a certain predefined hand gesture, the hand gesture recognition module sends a corresponding vision correction instruction to the virtual reality head-mounted device, and the virtual reality head-mounted device, according to the received instruction, adjusts the current visual position of the user or renewedly provides the user with an initial visual position.

In still another preferred embodiment of the present disclosure, a unique voice instruction is defined corresponding to each of the instructions of the vision correction, such as "restore the initial position" and "turn back", and voice of the user is monitored by providing a voice recognition module on the virtual reality head-mounted device or utilizing a voice recognition module already provided on the virtual reality head-mounted device. When it is monitored that the user makes a certain predefined voice instruction, the voice recognition module sends a corresponding vision correction instruction to the virtual reality head-mounted device, and the virtual reality head-mounted device, according to the received instruction, adjusts the current visual position of the user or renewedly provides the user with an initial visual position.

In yet another preferred embodiment of the present disclosure, a unique eye action is defined corresponding to each of the instructions of the vision correction, such as winking or gazing for a time duration exceeding a preset duration, and eye action of the user is monitored by providing an eye tracking module on the virtual reality head-mounted device or utilizing an eye tracking module already provided on the virtual reality head-mounted device. If it is monitored that the user makes a predefined eye action, the eye tracking module sends a corresponding vision correction instruction to the virtual reality head-mounted device, and the virtual reality head-mounted device, according to the received instruction, adjusts the current visual position of the user or renewedly provides the user with an initial visual position.

In yet another preferred embodiment of the present disclosure, a correction button corresponding to each of the instructions of the vision correction is displayed to the user in the virtual reality environments. When the user presses down a certain correction button, the button sends a corresponding vision correction instruction to the virtual reality head-mounted device, and the virtual reality head-mounted device, according to the received instruction, adjusts the current visual position of the user or renewedly provides the user with an initial visual position.

During the process when the user is experiencing the virtual reality environment, occasionally the visual sense of the user himself has an unpredictable change, which results in that the user cannot experience the virtual reality environment with the correct visual position, or in certain specific usage scenes the user is required to manually regulate the visual position to a proper position. By the above several preferred embodiments, the user can conveniently manually perform vision correction, thereby satisfying diverse demands of the user. The modes for manually performing vision correction provided by the above several preferred embodiments can be used alone or in combination according to needs.

The method of vision correction in a virtual reality environment provided by the present disclosure, by proper vision correction, enables the user to obtain the best operation experience, and meanwhile can avoid and alleviate some problems of dizziness, fatigue and so on caused by the problems of visual sense in virtual reality environments.

It should be known that, the "the first time" described in the present disclosure can refer to that the user enters the virtual reality environment for the first time ever, and can also refer to that the user enters the virtual reality environment for the first time at a time moment.

To conclude, the method of vision correction in a virtual reality environment provided by the present disclosure, compared with the prior art, has the following advantageous effects:

1. The present disclosure, by monitoring the state of the user using the virtual reality device and the change of the virtual reality scene, if the user is for the first time, or for the first time at a time moment, entering the virtual reality environment, if the user is in an unstable state in the virtual reality environment and if the scene of the virtual reality environment is taking discontinuous switching, provides the user with an initial visual position, realizes automatic vision correction according to the usage scenes and the cognition custom of the user, and enables the user to start from a proper visual position to experience the virtual reality environment, which reduces user operation and provides better user experience.

2. The present disclosure, on the basis of the automatic vision correction according to the usage scenes and the cognition custom, provides an interface for manually performing vision correction, and provides various modes for manual correction, namely joystick keys, virtual push buttons, finger recognition, voice recognition and eye tracking. The user can, according to his own practical demands, adjust the visual position to an appropriate position by one or more of the above modes, to thereby satisfy the diverse demands of the user.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

The invention claimed is:

1. A method of vision correction in a virtual reality environment, comprises:
   judging if a user is for the first time entering the virtual reality environment, and when the user is for the first time entering the virtual reality environment, providing the user with an initial visual position;
   monitoring in real time action of the user, and judging if the user is in a stable state in the virtual reality environment; when the user is in a stable state, adjusting the visual position of the user according to change of sight lines of the user; and when the user is in an unstable state, renewedly providing the user with an initial visual position; and
   monitoring in real time change of a scene in the virtual reality environment, and when the scene of the virtual reality environment is taking discontinuous switching, renewedly providing the user with an initial visual position according to a new scene.

2. The method of vision correction in a virtual reality environment according to claim 1, wherein the judging if a user is for the first time entering the virtual reality environment specifically comprises:
   providing a distance/light sensor on a virtual reality head-mounted device or utilizing a distance/light sensor already provided on a virtual reality head-mounted device, to monitor in real time a distance between the virtual reality head-mounted device and head of the user; and
   when the distance/light sensor monitors that at a certain time moment the distance between the virtual reality head-mounted device and the head of the user becomes less than a preset distance from greater than the preset distance, determining that the user is for the first time entering the virtual reality environment at the time moment.

3. The method of vision correction in a virtual reality environment according to claim 1, wherein the judging if a user is for the first time entering the virtual reality environment specifically comprises:
   when a certain virtual reality application starts up, determining that the user is for the first time entering the virtual reality environment at the time moment when the virtual reality application starts up.

4. The method of vision correction in a virtual reality environment according to claim 2, wherein the monitoring in real time action of the user, and judging if the user is in a stable state in the virtual reality environment specifically comprises:

provopid a geomagnetic sensor, a gyroscope and an accelerometer on a virtual reality head-mounted device or utilizing a geomagnetic sensor, a gyroscope and an accelerometer already provided on a virtual reality head-mounted device, to monitor in real time the action of the head of the user, and if amplitude or speed of the action exceeds a preset threshold, determining that the user is in an unstable state, or else determining that the user is in a stable state.

5. The method of vision correction in a virtual reality environment according to claim 1, wherein the method further comprises: providing the user with an interface for manually performing vision correction, to enable the user to adjust the visual position by the interface according to his own needs.

6. The method of vision correction in a virtual reality environment according to claim 5, wherein the providing the user with an interface for manually performing vision correction specifically comprises:

connecting a joystick to a virtual reality head-mounted device, and setting a correspondence relation between instructions of the vision correction and keys of the joystick; and when a certain key of the joystick is pressed down, sending a corresponding vision correction instruction to the virtual reality head-mounted device, to correspondingly adjust the current visual position of the user or renewedly provide the user with an initial visual position.

7. The method of vision correction in a virtual reality environment according to claim 5, wherein the providing the user with an interface for manually performing vision correction specifically comprises:

defining a unique hand gesture corresponding to each of the instructions of the vision correction;

when it is monitored that the user makes a certain predefined hand gesture, sending a corresponding vision correction instruction to the virtual reality head-mounted device, to correspondingly adjust the current visual position of the user or renewedly provide the user with an initial visual position.

8. The method of vision correction in a virtual reality environment according to claim 5, wherein the providing the user with an interface for manually performing vision correction specifically comprises:

defining a unique voice instruction corresponding to each of the instructions of the vision correction;

when it is monitored that the user makes a certain predefined voice instruction, sending a corresponding vision correction instruction to the virtual reality head-mounted device, to correspondingly adjust the current visual position of the user or renewedly provide the user with an initial visual position.

9. The method of vision correction in a virtual reality environment according to claim 5, wherein the providing the user with an interface for manually performing vision correction specifically comprises:

defining a unique eye action corresponding to each of the instructions of the vision correction;

when it is monitored that the user makes a predefined eye action, sending a corresponding vision correction instruction to the virtual reality head-mounted device, to correspondingly adjust the current visual position of the user or renewedly provide the user with an initial visual position.

10. The method of vision correction in a virtual reality environment according to claim 5, wherein the providing the user with an interface for manually performing vision correction specifically comprises:

displaying in the virtual reality environment a correction button corresponding to each of the instructions of the vision correction; and when a certain correction button is pressed down by the user, sending a corresponding vision correction instruction to a virtual reality head-mounted device, to correspondingly adjust the current visual position of the user or renewedly provide the user with an initial visual position.

11. The method of vision correction in a virtual reality environment according to claim 3, wherein the monitoring in real time action of the user, and judging if the user is in a stable state in the virtual reality environment specifically comprises:

providing a geomagnetic sensor, a gyroscope and an accelerometer on a virtual reality head-mounted device or utilizing a geomagnetic sensor, a gyroscope and an accelerometer already provided on a virtual reality head-mounted device, to monitor in real time the action of the head of the user, and if amplitude or speed of the action exceeds a preset threshold, determining that the user is in an unstable state, or else determining that the user is in a stable state.

* * * * *